(12) United States Patent
Nishiyuki et al.

(10) Patent No.: US 9,754,191 B2
(45) Date of Patent: Sep. 5, 2017

(54) FEATURE IMAGE GENERATION APPARATUS, CLASSIFICATION APPARATUS AND NON-TRANSITORY COMPUTER-READABLE MEMORY, AND FEATURE IMAGE GENERATION METHOD AND CLASSIFICATION METHOD

(71) Applicant: MegaChips Corporation, Osaka-shi (JP)

(72) Inventors: Kenta Nishiyuki, Kusatsu (JP); Kenta Nagamine, Suita (JP)

(73) Assignee: MegaChips Corporation, Osaka-shi (JP)

( * ) Notice: Subject to any disclaimer, the term of this patent is extended or adjusted under 35 U.S.C. 154(b) by 0 days.

(21) Appl. No.: 14/986,978

(22) Filed: Jan. 4, 2016

(65) Prior Publication Data
US 2016/0210529 A1 Jul. 21, 2016

(30) Foreign Application Priority Data
Jan. 19, 2015 (JP) .................................. 2015-007444

(51) Int. Cl.
*G06K 9/48* (2006.01)
*G06K 9/62* (2006.01)
(Continued)

(52) U.S. Cl.
CPC ............ *G06K 9/627* (2013.01); *G06K 9/3208* (2013.01); *G06K 9/6202* (2013.01); *G07D 5/005* (2013.01); *G06K 9/4604* (2013.01); *G06K 9/48* (2013.01)

(58) Field of Classification Search
CPC ............. G01N 23/225; G01N 21/6452; G01N 2021/6441; H01J 2237/2817; A61B 5/1075; A61B 5/1077; A61B 5/411; A61B 5/7282; A61B 5/7264; A61B 5/1128; G06T 2207/20212; G06T 7/003; G06T 7/0034; G06T 7/60; G06T 11/60; G06T 3/00; G06T 7/0028; G06T 7/0044; G06T 2207/10004; G06T 2207/20124; G06K 9/6202; G06K 9/627; G06K 9/6211; G06K 9/6255; G06K 9/6215; G06K 9/00362; G06K 9/00013; G06K 9/0008; G06K 9/00617; G06K 2009/6213; G06K 9/481; G06K 9/6218;
(Continued)

(56) References Cited

U.S. PATENT DOCUMENTS 5,220,614 A * 6/1993 Crain ........................ G06K 9/00
 348/128
5,613,013 A * 3/1997 Schuette ................... G06K 9/32
 356/400

(Continued)

FOREIGN PATENT DOCUMENTS

JP 5317250 10/2013

*Primary Examiner* — Vu Le
*Assistant Examiner* — Aklilu Woldemariam
(74) *Attorney, Agent, or Firm* — Oblon, McClelland, Maier & Neustadt, L.L.P.

(57) ABSTRACT

A feature image generation apparatus includes circuitry. The circuitry generates, on the basis of a processing target image in which an object appears, a first image showing the object, and generates, as a feature image showing a feature of the object, at least a part of a rotational composite image obtained by composition of a plurality of rotated images obtained by rotating the first image.

5 Claims, 10 Drawing Sheets

(51) Int. Cl.
*G07D 5/00* (2006.01)
*G06K 9/32* (2006.01)
*G06K 9/46* (2006.01)

(58) Field of Classification Search
CPC ... G06K 9/00369; G07D 5/005; G06F 17/3025; G06F 3/00; A45D 2044/007; B01J 2219/00659
USPC ....... 382/197, 199, 200, 205, 281, 103, 141, 382/142, 143–159
See application file for complete search history.

(56) References Cited

U.S. PATENT DOCUMENTS

| | | | | |
|---|---|---|---|---|
| 6,807,286 | B1* | 10/2004 | Krumm | G06K 9/6255 382/103 |
| 7,162,102 | B2* | 1/2007 | Cahill | G06T 3/00 382/284 |
| 7,359,541 | B2* | 4/2008 | Kawano | G06T 7/194 382/132 |
| 8,688,579 | B1* | 4/2014 | Ethington | G06Q 20/0425 705/35 |
| 2002/0150909 | A1* | 10/2002 | Stuelpnagel | B01J 19/0046 435/6.1 |
| 2003/0185432 | A1* | 10/2003 | Hong | G06K 9/6282 382/151 |
| 2004/0128656 | A1* | 7/2004 | Yamagata | G06T 3/00 717/136 |
| 2005/0249394 | A1* | 11/2005 | Jones | G06K 9/033 382/135 |
| 2006/0008116 | A1* | 1/2006 | Kiraly | G06T 7/20 382/103 |
| 2008/0304751 | A1* | 12/2008 | Hayasaki | G06K 9/3216 382/195 |
| 2009/0284754 | A1* | 11/2009 | Haddock | G01B 11/06 356/601 |
| 2009/0297038 | A1* | 12/2009 | Ishikawa | G06K 9/3275 382/209 |
| 2009/0309966 | A1* | 12/2009 | Chen | G06T 7/20 348/135 |
| 2010/0226563 | A1* | 9/2010 | Takayama | G06K 9/6253 382/154 |
| 2014/0225362 | A1* | 8/2014 | Quinn | B44F 1/10 283/85 |
| 2016/0155018 | A1* | 6/2016 | Sakai | G06K 9/6202 382/197 |
| 2016/0210529 | A1* | 7/2016 | Nishiyuki | G06K 9/627 |

* cited by examiner

FIG. 18

FEATURE IMAGE GENERATION APPARATUS, CLASSIFICATION APPARATUS AND NON-TRANSITORY COMPUTER-READABLE MEMORY, AND FEATURE IMAGE GENERATION METHOD AND CLASSIFICATION METHOD

BACKGROUND OF THE INVENTION

Field of the Invention

The present invention relates to image processing.

Description of the Background Art

The technology of classifying whether an object corresponds to a comparison target using image processing has conventionally been proposed. For example, Japanese Patent No. 5317250 discloses the technology of classifying, using image processing, whether a component being a test target that appears in an image corresponds to a genuine component, namely, a non-defective item.

SUMMARY OF THE INVENTION

A feature image generation apparatus includes circuitry. The circuitry generates, on the basis of a processing target image in which an object appears, a first image showing the object; and generates, as a feature image showing a feature of the object, at least a part of a rotational composite image obtained by composition of a plurality of rotated images obtained by rotating the first image.

A classification apparatus includes circuitry. The circuitry generates, on the basis of a processing target image in which an object appears, a first image showing the object; generates, as a feature image showing a feature of the object, at least a part of a first rotational composite image obtained by composition of a plurality of first rotated images obtained by rotating the first image; and classifies, on the basis of the feature image, whether the object appearing in the processing target image corresponds to a comparison target.

A non-transitory computer-readable memory stores a control program for causing a computer to generate, on the basis of a processing target image in which an object appears, a feature image showing a feature of the object. The control program causes the computer to execute (a) generating, on the basis of the processing target image in which an object appears, a first image showing the object; and (b) generating, as the feature image showing a feature of the object, at least a part of a rotational composite image obtained by composition of a plurality of rotated images obtained by rotating the first image.

A non-transitory computer-readable memory stores a control program for causing a computer to classify whether an object appearing in a processing target image corresponds to a comparison target. The control program causes the computer to execute: (a) generating, on the basis of a processing target image in which an object appears, a feature image showing a feature of the object, and (b) classifying, on the basis of the feature image, whether the object appearing in the processing target image corresponds to a comparison target. The control program causes, in the step (a), the computer to execute (a-1) generating, on the basis of the processing target image, a first image showing the object, and (a-2) generating, as the feature image, at least a part of a rotational composite image obtained by composition of a plurality of rotated images obtained by rotating the first image.

A feature image generation method includes (a) generating, on the basis of a processing target image in which an object appears, a first image showing the object, and (b) generating, a second image as the feature image showing a feature of the object, at least a part of a rotational composite image obtained by composition of a plurality of rotated images obtained by rotating the first image.

A classification method classifies whether an object appearing in a processing target image corresponds to a comparison target. The classification method includes (a) generating, on the basis of a processing target image in which an object appears, a feature image showing a feature of the object, and (b) classifying, on the basis of the feature image, whether the object appearing in the processing target image corresponds to a comparison target. The step (a) includes (a-1) generating, on the basis of the processing target image, a first image showing the object, and (a-2) generating, as the feature image, at least a part of a rotational composite image obtained by composition of a plurality of rotated images obtained by rotating the first image.

These and other objects, features, aspects and advantages of the present invention will become more apparent from the succeeding detailed description of the present invention when taken in conjunction with the accompanying drawings.

DESCRIPTION OF EMBODIMENTS

Configuration of Image Processing System 1

Figure 1:
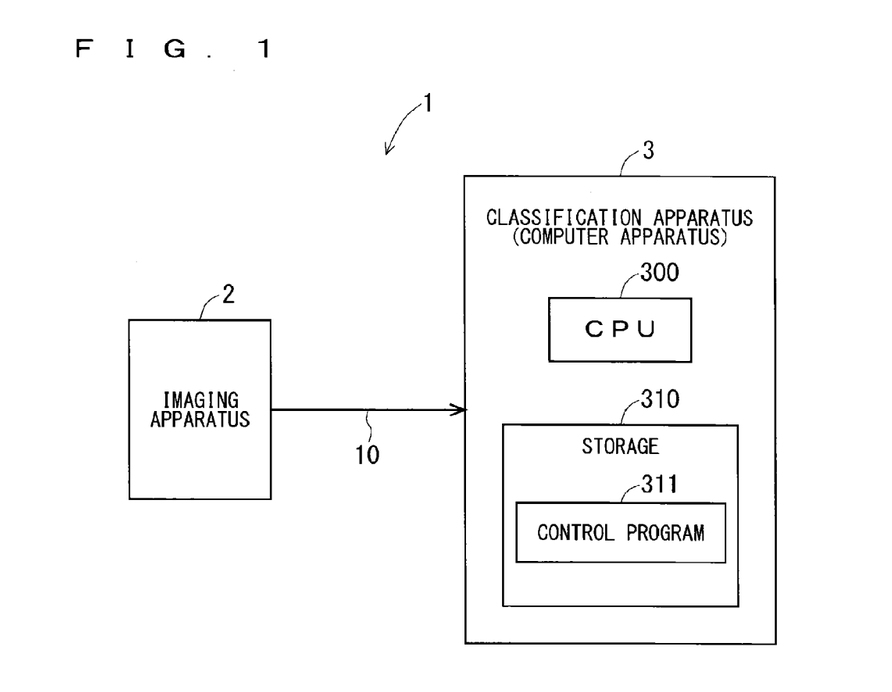
FIG. 1 illustrates a configuration of an image processing system.

FIG. 1 illustrates a configuration of an image processing system 1 according to an embodiment. The image processing system 1 according to this embodiment is a system that uses image processing to classify whether an object corresponds to a comparison target. The image processing system 1 is provided in a vending machine that accepts, for example, a circular coin. The image processing system 1 classifies whether a coin inserted from the outside into the vending machine in operation corresponds to a genuine one. In other words, the image processing system 1 classifies whether a coin inserted from the outside to the vending machine in operation is a genuine one, that is, the authenticity of the coin. In this embodiment, accordingly, an object is a coin. A comparison target to be compared with the object is a genuine coin (authentic coin). The object may not be a coin. The outline of the object may not be circular.

As illustrated in FIG. 1, the image processing system 1 includes an imaging apparatus 2 and a classification apparatus 3. The imaging apparatus 2 captures an image of a coin inserted into the vending machine to generate a captured image 10 in which the coin appears, and then outputs the captured image 10 to the classification apparatus 3. In the vending machine, a coin moves while rotating on a rail, and the imaging apparatus 2 captures an image of the rotating coin. In this embodiment, the captured image 10 generated by the imaging apparatus 2 is a color image, which may be a gray scale image.

Figure 2:
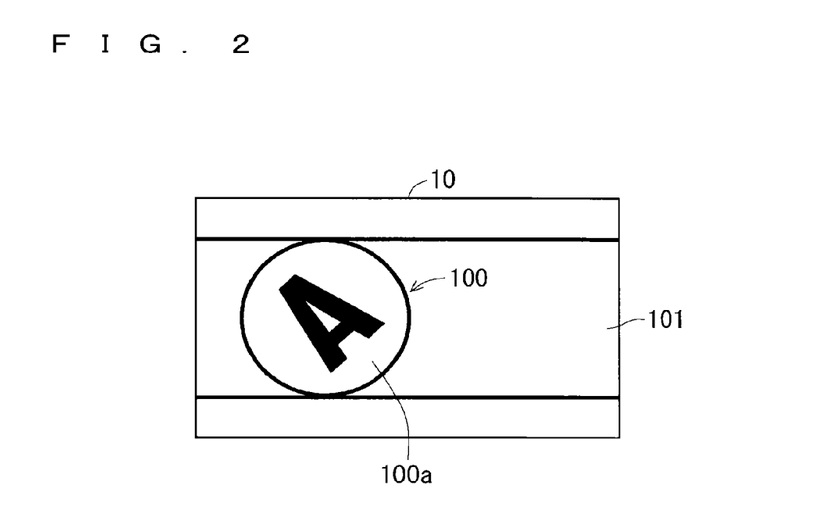
FIG. 2 schematically illustrates an example of a captured image.

FIG. 2 schematically illustrates an example of a captured image 10 obtained by the imaging apparatus 2. A genuine coin 100, that is, an authentic coin 100 appears in the captured image 10 illustrated in FIG. 2. Also appearing in the captured image 10 is a rail 101 being a background. For example, an alphabet "A" pattern appears on a main surface 100a of the authentic coin 100. The authentic coin 100 may have any other pattern. The authentic coin 100 may have patterns on both main surfaces.

In this embodiment, the coin 100 moves on the rail 101 while rotating about the axis of rotation passing through the center between the main surfaces of the coin 100 and extending in the thickness direction. The imaging apparatus 2 captures an image of the coin 100 from the main surface 100a side of the coin 100. The main surface 100a of the coin 100 accordingly appears in the captured image 10.

The classification apparatus 3 classifies whether the coin 100 appearing in the captured image 10 input from the imaging apparatus 2 is genuine, that is, whether the coin 100 is genuine, and then, outputs the classification result. The classification result is input to a controller that is provided in the vending machine and manages the actions of the vending machine. The controller performs various actions on the basis of the input classification result. Hereinafter, the processing of classifying whether a coin 100 appearing in a captured image 10 is genuine by the classification apparatus 3 is referred to as "coin classification processing."

In this embodiment, the classification apparatus 3 is one type of computer apparatus and includes a central processing unit (CPU) 300 and a storage 310. The storage 310 is formed of a non-transitory recording medium readable by the CPU 300, such as a read only memory (ROM) and a random access memory (RAM). The storage 310 stores a control program 311 for controlling the classification apparatus 3 (computer apparatus). The CPU 300 executes the control program 311 in the storage 310, so that various functional blocks are formed in the classification apparatus 3.

The various functions of the classification apparatus 3 may be partially or entirely achieved by a dedicated hardware circuit that requires no program (software) for executing the functions and includes a logic circuit. The storage 310 may include a non-transitory computer-readable recording medium other than the RUM and the RAM. The storage 310 may include, for example, a small hard disk drive and a solid state drive (SSD).

Figure 3:
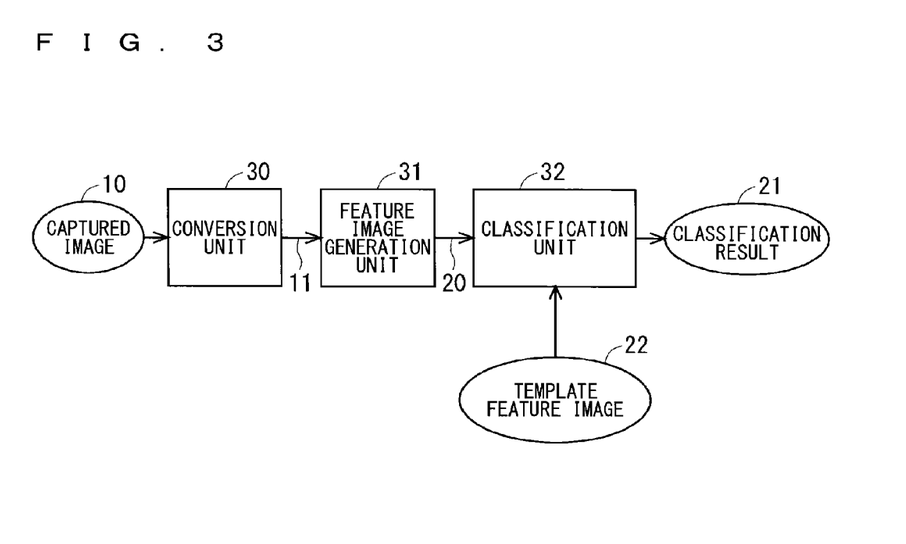
FIG. 3 illustrates a configuration of a classification apparatus.

FIG. 3 illustrates a plurality of functional blocks of the classification apparatus 3. As illustrated in FIG. 3, the classification apparatus 3 includes a conversion unit 30, a feature image generation unit 31, and a classification unit 32 as the functional blocks. The conversion unit 30 converts a captured image 10 input from the imaging apparatus 2 from a color image to a gray scale image, and outputs the captured image 10 after the conversion as a captured image 11.

The feature image generation unit 31 generates, on the basis of the captured image 11 in which the coin 100 appears, a feature image 20 showing the feature of the coin 100. The classification unit 32 classifies whether a coin 100 appearing in a captured image 11 is genuine on the basis of the feature image 20 generated by the feature image generation unit 31, and outputs a classification result 21. In this embodiment, the classification unit 32 compares the feature image 20 generated from the captured image 11 by the feature image generation unit 31 with a template feature image 22 showing the feature of the authentic coin 100 to classify, on the basis of the comparison result, whether the coin 100 appearing in the captured image 11 is genuine. The feature image generation unit 31 may be referred to as a "feature image generation device 31."

Figure 4:
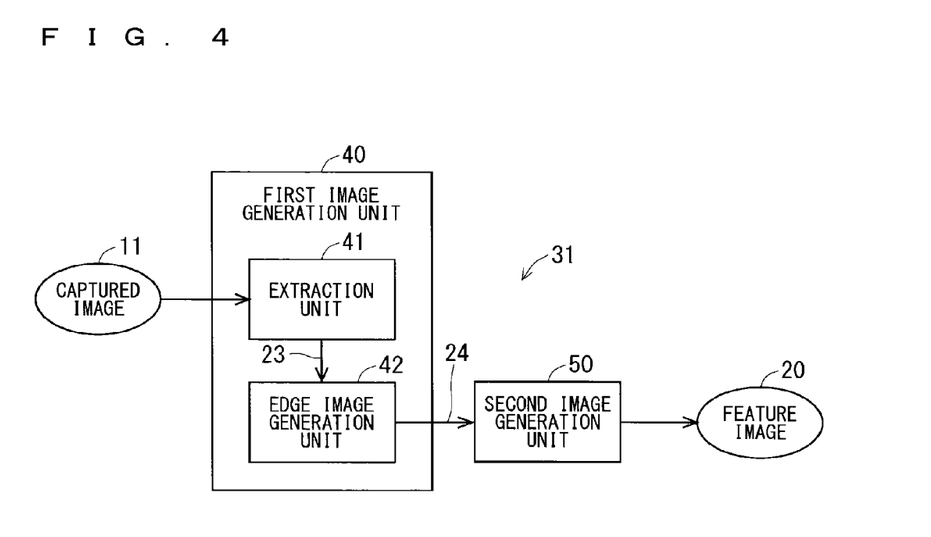
FIG. 4 illustrates a configuration of a feature image generation unit.

FIG. 4 illustrates a configuration of the feature image generation unit 31. As illustrated in FIG. 4, the feature image generation unit 31 includes a first image generation unit 40 and a second image generation unit 50. The first image generation unit 40 generates, on the basis of the captured image 11, a first image 24 showing a coin 100. The second image generation unit 50 generates, as a feature image 20, at least a part of a rotational composite image obtained by composition of a plurality of rotated images obtained by rotating the first image 24 generated by the first image generation unit 40.

The first image generation unit 40 includes an extraction unit 41 and an edge image generation unit 42. The extraction unit 41 extracts, from the captured image 11, a coin region 23 in which the coin 100 appears. The edge image generation unit 42 performs edge detection on the coin region 23 extracted by the extraction unit 41, thereby generating an edge image as the first image 24.

<Flow of Coin Classification Processing>

Figure 5:
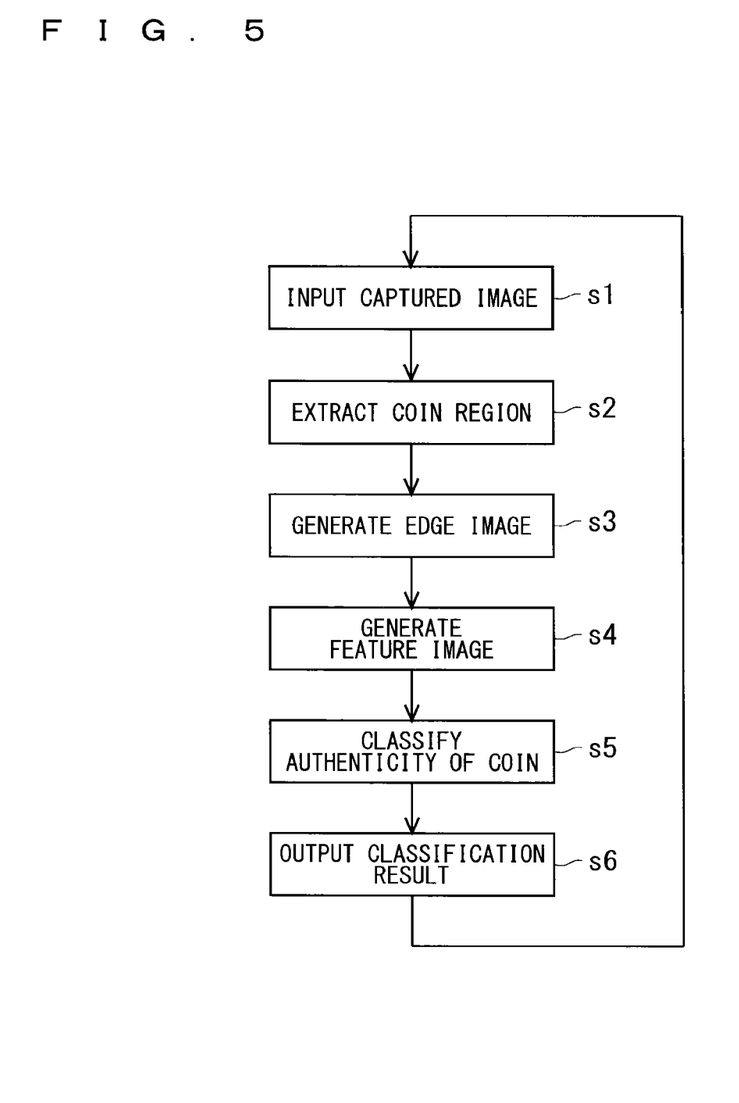
FIG. 5 is a flowchart illustrating an action of the classification apparatus.

The following will describe a series of actions of the classification apparatus 3 when the classification apparatus 3 performs the coin classification processing while a vending machine is in operation. FIG. 5 is a flowchart illustrating the coin classification processing.

As illustrated in FIG. 5, in Step s1, when receiving a captured image 10 from the imaging apparatus 2, the classification apparatus 3 converts the captured image 10 from a color image to a gray scale image by the conversion unit 30, and sets a resultant captured image 11 as a process target. Hereinafter, a captured image 11 to be processed may be referred to as a "processing target image 11."

Then, in Step s2, the extraction unit 41 extracts a coin region 23 in which a coin 100 appears from a processing target image 11. In Step s3, then, the edge image generation unit 42 performs edge detection on the coin region 23 extracted by the extraction unit 41 to generate an edge image as a first image 24 showing the coin 100. In Step s4, then, the second image generation unit 50 generates, as a feature image 20, at least a part of a rotational composite image obtained by composition of a plurality of rotated images obtained by rotating the edge image (first image 24) generated by the edge image generation unit 42.

In Step s5, then, the classification unit 32 compares the feature image 20 generated by the second image generation unit 50 with the template feature image 22, and on the basis of the comparison result, classifies whether the coin 100 appearing in the processing target image 11 is genuine. In other words, the classification unit 32 classifies whether the coin 100 appearing in the captured image 10 generated by the imaging apparatus 2 is genuine on the basis of the result of the comparison between the feature image 20 and the template feature image 22. In Step s6, then, the classification unit 32 outputs a classification result 21 of Step s5 to a controller provided in the vending machine. If the coin 100 appearing in the captured image 10 is not genuine, in other words, if the coin 100 appearing in the captured image 10 does not correspond to genuine one, the controller issues an alarm to the outside by, for example, sounding an alarm through a loudspeaker or displaying alarming information on the display.

Then, when receiving a new captured image 10, the classification apparatus 3 executes Steps s2 to s6 on a captured image 11 obtained from the captured image 10 as a new process target. Hereinafter, the classification apparatus 3 performs similar actions every time it receives a captured image 10.

<Detailed Description of Elements>

The following will describe the actions of the extraction unit 41, the edge image generation unit 42, the second image generation unit 50, and the classification unit 32 in more detail.

<Extraction Unit>

Figure 6:
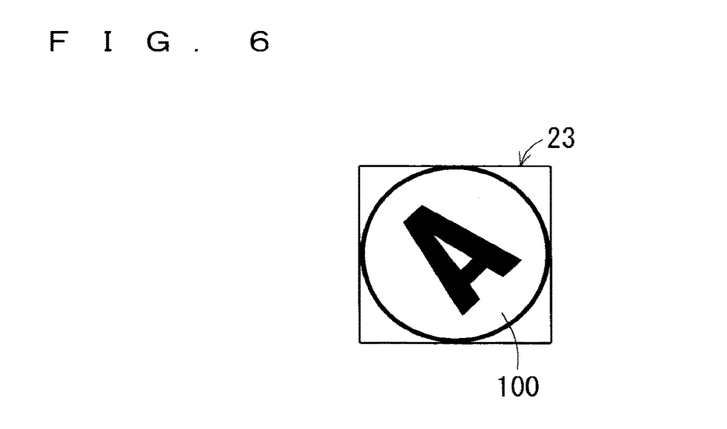
FIG. 6 schematically illustrates an example of a coin region.

FIG. 6 schematically illustrates an example of a coin region 23 extracted from a captured image 11 by the extraction unit 41. The coin region 23 can be extracted from the captured image 11 by various methods.

One example is a first extraction method using a fact that a coin 100 has a circular outline. In the first extraction method, first, edge detection is performed on a captured image 11 to generate an edge image. As the method of generating an edge image, for example, the Sobel method, the Laplacian method, the Canny method, and any other method can be used. Next, a circular region is extracted from the generated edge image. For example, the Hough transform is used as the method of extracting a circular region. Then, the circular region in the captured image 11, located at the same position as the position of the circular region in an edge image, is set as a coin region 23.

Another method is a second extraction method of extracting a coin region 23 from a captured image 11 using background subtraction and labeling. In the second extraction method, first, a background subtraction image showing a difference between the captured image 11 and a background image (image in which only the captured image 11 appears) is generated, and the generated background subtraction image is binarized. Then, labeling such as 4-connection is performed on a binary background subtraction image. Then, a partial region in the captured image 11, which is located at the same position as the position of the connection region (independent region) obtained as a result of the labeling, in the binary background subtraction image is set as the coin region 23.

In this embodiment, the extraction unit 41 extracts a coin region 23 from a captured image 11 by a method different from the two methods described above. The following will describe the action of the extraction unit 41 according to this embodiment. The extraction unit 41 may extract a coin region 23 from a captured image 11 by any one of the two methods described above.

Figure 7:
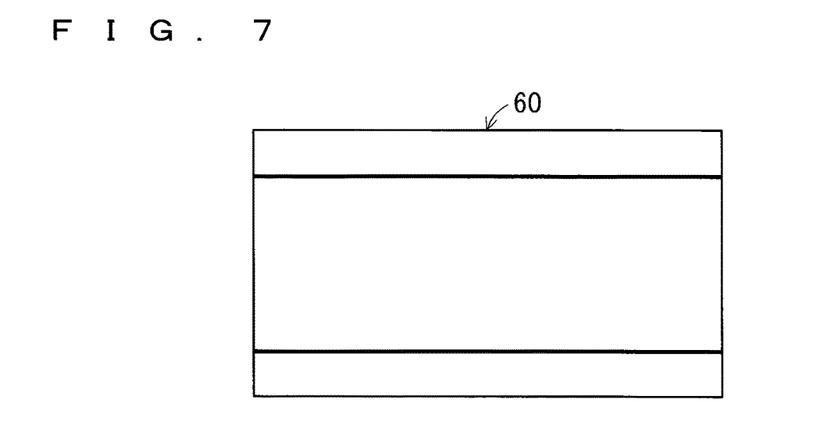
FIG. 7 schematically illustrates an example of a background image.
Figure 8:
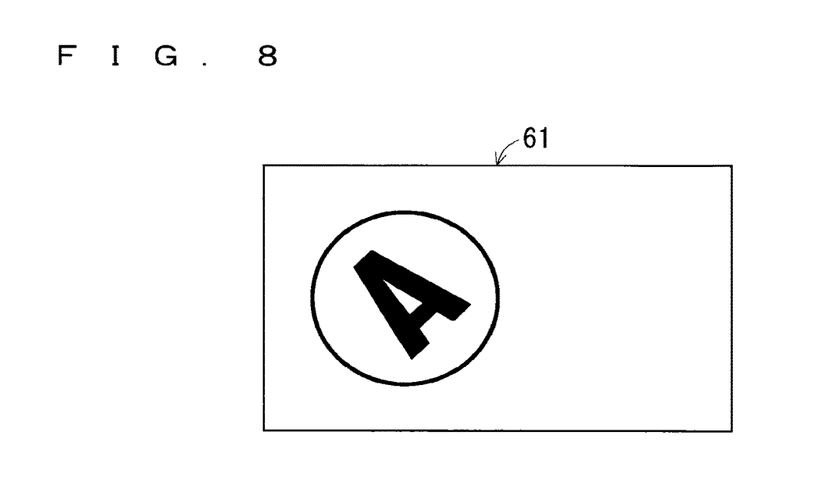
FIG. 8 schematically illustrates an example of a background subtraction image.

First, the extraction unit 41 generates a background subtraction image showing a difference between a captured image 11 and a background image 60 (an image in which only the background of the captured image 11 appears) and binarizes the generated background subtraction image. FIG. 7 schematically illustrates a background image 60, and FIG. 8 schematically illustrates a binary background subtraction image 61. In the binary images schematically illustrated in FIG. 8 and the following drawings, a region (high-intensity region) having a pixel value "1" is shown in black, and a region (low-intensity region) having a pixel value "0" is shown in white. The background image 60 is stored in advance in the storage 310 of the classification apparatus 3.

Figure 9:
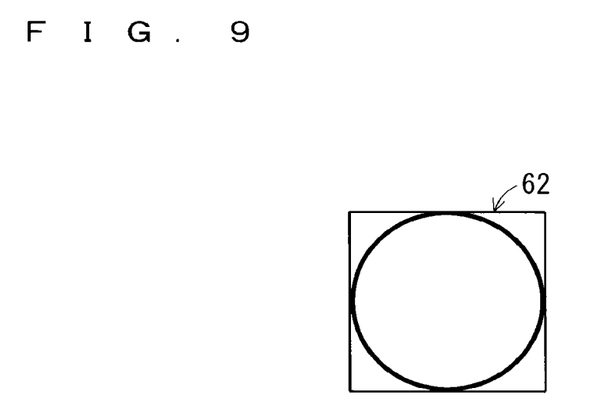
FIG. 9 schematically illustrates an example of an outline template.

Next, the extraction unit 41 performs, on the binary background subtraction image 61, template matching using a binary outline template 62 indicating the outline of the coin 100. Specifically, the extraction unit 41 identifies where in the background subtraction image 61 a region similar to the outline template 62 is located. In other words, the extraction unit 41 identifies where in the background subtraction image 61 a region corresponding to the outline of the coin 100 indicated in the outline template 62 is located. FIG. 9 schematically illustrates the outline template 62. The outline template 62 is stored in advance in the storage 310 of the classification apparatus 3.

Figure 10:
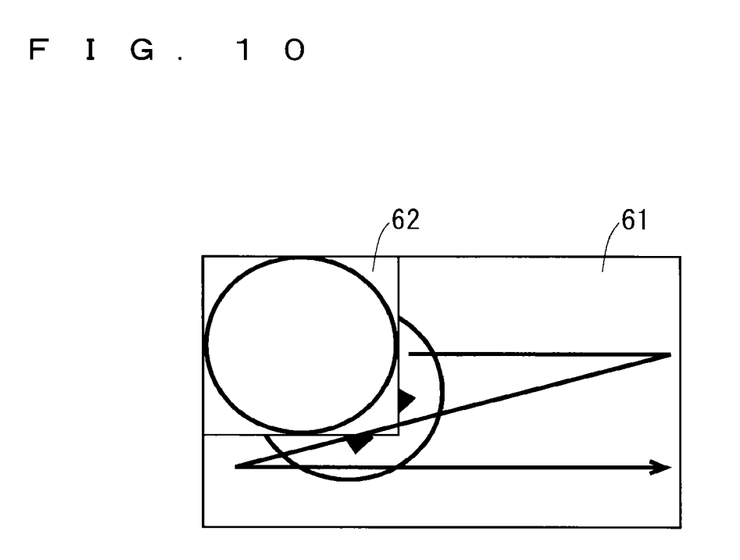
FIG. 10 is a diagram for explaining template matching.
Figure 11:
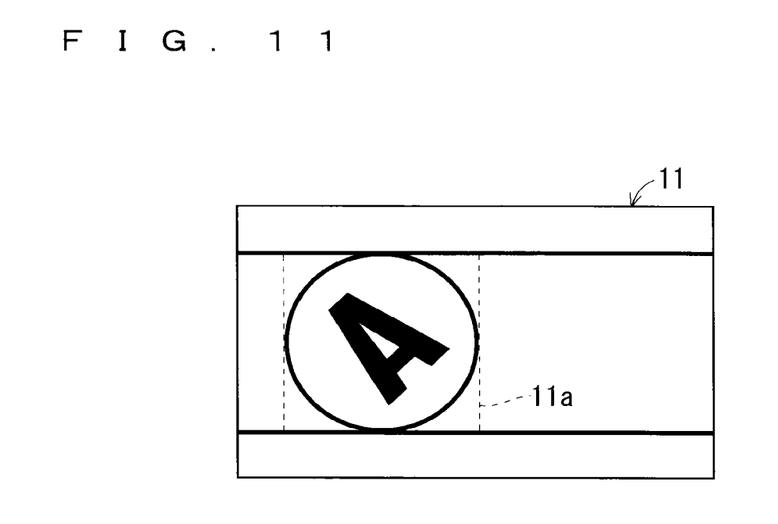
FIG. 11 is a diagram for explaining processing of extracting a coin region.

In template matching, as illustrated in FIG. 10, the extraction unit 41 causes the outline template 62 to move incrementally in a raster scanning direction on the background subtraction image 61. In other words, the extraction unit 41 subjects the outline template 62 to raster scanning on the background subtraction image 61. In this scanning, the extraction unit 41 generates, at each position of the outline template 62, an AND image of the outline template 62 and a partial region of the background subtraction image 61 overlapping the outline template 62. This results in the generation of a plurality of binary AND images. Then, the extraction unit 41 identifies, on the background subtraction image 61, the position of the outline template 62 used in the generation of an AND image having the largest number of pixels (high-intensity pixels) having a pixel value "1" from among the plurality of generated AND images. This position is a position at which a region similar to that of the outline template 62 is located in the background subtraction image 61. Then, as illustrated in FIG. 11, the extraction unit 41 extracts, as the coin region 23, a partial region 11a in the captured image 11 located at the same position as the identified position. In other words, the extraction unit 41 extracts, as the coin region 23, a partial region 11a in the captured image 11 that overlaps the outline template 62 when the outline template 62 is placed at the same position as the identified position in the captured image 11. In this extraction, in the partial region 11a, the coin region 23 may be a region having a pixel value "0" of each pixel outside the circle indicated by the outline template 62 on the partial region 11a. The coin region 23 extracted by the extraction unit 41 is a gray scale image. The outline of the coin region 23 is quadrangular in this embodiment, which may be circular.

<Edge Image Generation Unit>

Figure 12:
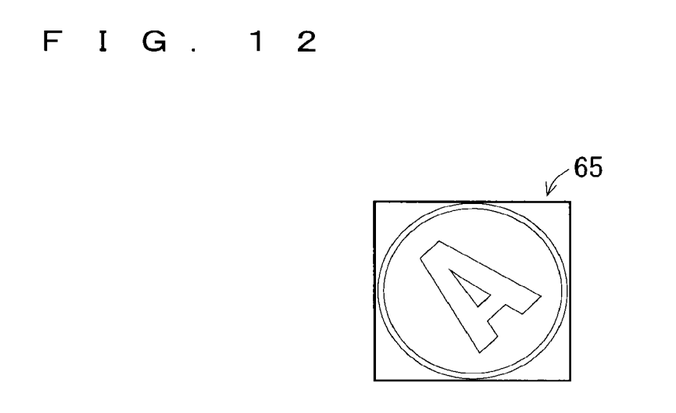
FIG. 12 schematically illustrates an example of an edge image.

The edge image generation unit 42 performs edge detection on a coin region 23 extracted by the extraction unit 41 to generate an edge image 65 using the Sobel method, the Laplacian method, the Canny method, or any other method. In this embodiment, the edge image generation unit 42 uses, for example, the Sobel method that is easy to process. The edge image 65 is a binary image. FIG. 12 schematically illustrates the edge image 65.

<Second Image Generation Unit>

The second image generation unit 50 generates, as a feature image 20, at least a part of a rotational composite image obtained by composition of a plurality of rotated images obtained by rotating the edge image 65 generated by the edge image generation unit 42. In this embodiment, the second image generation unit 50 generates, as a feature image 20, a rotational composite image obtained by composition of a plurality of rotated images obtained by rotating an edge image 65. Herein, the rotation of the edge image 65 may be the rotation with a rotation angle of 0°. The following will describe a method of generating the rotational composite image.

Figure 13:
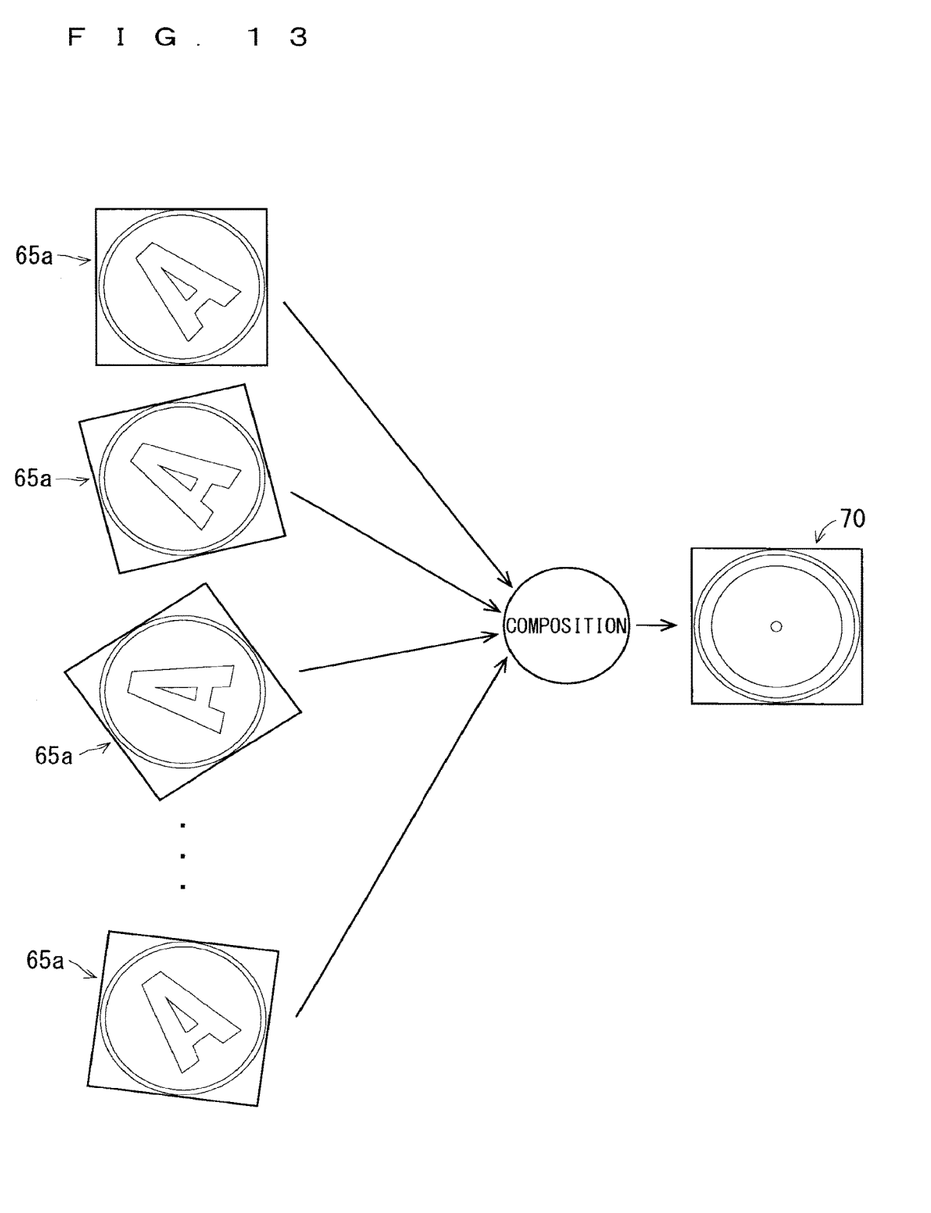
FIG. 13 is a diagram for explaining a method of generating a rotational composite image.

FIG. 13 is a diagram for explaining the method of generating a rotational composite image 70 (second image 25) by the second image generation unit 50. The second image generation unit 50 causes an edge image 65 to rotate in increments of a predetermined angle α, thereby generating a plurality of rotated images 65a as illustrated in FIG. 13. Herein, the second image generation unit 50 causes the edge image 65 to rotate in increments of the predetermined angle α until a total of rotation angles is equal to (360°−α). In this embodiment, the second image generation unit 50 causes an edge image 65 to rotate in increments of, for example, 2° (α=2°), thereby generating 180 rotated images 65a. Then, the second image generation unit 50 composites the plurality of rotated images 65a generated to generate a rotational composite image 70. Specifically, the second image generation unit 50 averages a plurality of rotated images 65a with the centers thereof coinciding with each other, thereby setting a resultant averaged image as a rotational composite image 70. The second image generation unit 50 uses the generated rotational composite image 70 as a feature image 20 showing the feature of the coin 100 appearing in the captured image 11.

In the composition of a plurality of rotated images 65a, the second image generation unit 50 does not use a region of each rotated image 65a that extends beyond the outline of a rotated image 65a (that is, an edge image 65 that has not rotated) having a rotation angle of 0°. The rotational composite image 70 is accordingly a gray scale image equal in size to the edge image 65.

As described above, the imaging apparatus 2 captures an image of a rotating coin 100, thereby generating a captured image 10 in which the coin 100 appears. Thus, the rotation angle (rotation angle of a pattern provided to the coin 100) of the coin 100 appearing in the captured image 11, generated by the conversion unit 30 of the classification apparatus 3, is not always the same. That is to say, the circumferential orientation of the coin 100 appearing in the captured image 11 is not always constant. Meanwhile, the rotational composite image 70 is obtained by composition of a plurality of rotated images 65a obtained by rotating an edge image 65 showing the coin 100 appearing in the captured image 11, and thus, even when the rotation angle of the coin 100 appearing in the captured image 11 varies (even when the circumferential orientation of the coin 100 appearing in the captured image 11 is not constant), for a genuine coin 100, a rotational composite image 70 obtained from the captured image 11 changes little. It can therefore be said that the rotational composite image 70 is a feature image 20 that is unsusceptible to the rotation angle of the coin 100 appearing in the captured image 11 and shows the feature of the coin 100. That is, it can be said that the rotational composite image 70 is a feature image 20 that is unsusceptible to the circumferential orientation of the coin 100 appearing in the captured image 11 and shows the feature of the coin 100.

<Classification Unit>

The classification unit 32 compares the rotational composite image 70 (feature image 20) generated by the second image generation unit 50 with the template feature image 22 showing the feature of the authentic coin 100 to classify, on the basis of the comparison result, whether the coin 100 appearing in the captured image 11 is genuine. A feature image 20 (rotational composite image 70) showing the feature of the authentic coin 100, which is generated by the feature image generation unit 31 from the captured image 11 appearing in the authentic coin 100, is used as the template feature image 22. While a vending machine is not in operation, an authentic coin 100 is inserted into the vending machine to obtain a template feature image 22. The image processing system 1 in the vending machine generates a captured image 11 in which the inserted authentic coin 100 appears. This captured image 11 is referred to as a "standard image 11." In the image processing system 1, the feature image generation unit 31 generates a feature image 20 (rotational composite image 70) showing the feature of the authentic coin 100 appearing in the standard image 11 on the basis of the standard image 11. This feature image 20 is referred to as a "standard feature image 20." In this embodiment, the standard feature image 20 serves as a template feature image 22. The template feature image 22 generated while the vending machine is not in operation is stored in the storage 310 of the classification apparatus 3. Hereinafter, a feature image 20 (a feature image 20 generated from a captured image 11 in which a coin 100 whose authenticity is classified appears) generated while the vending machine is in operation may be referred to as a "target feature image 20" for differentiation from the standard feature image 20.

The classification unit 32 obtains, for example, a degree of similarity (a degree of difference) between the rotational composite image 70 (target feature image 20) and the template feature image 22, thereby comparing these images. In this embodiment, the classification unit 32 uses a sum of absolute difference (SAD) as a value indicating a degree of similarity. A large SAD means a low degree of similarity, while a small SAD means a high degree of similarity. Any other value, for example, a sum of squared difference (SSD) or a normalized correlation coefficient (NCC) may be used as the value indicating a degree of similarity.

The classification unit 32 classifies that the coin 100 appearing in the captured image 11 is genuine when the degree of similarity between the rotational composite image 70 and the template feature image 22 is high or classifies that the coin 100 appearing in the captured image 11 is not genuine when the degree of similarity is low. Specifically, the classification unit 32 classifies that the coin 100 appearing in the captured image 11 is genuine when the SAD between the rotational composite image 70 and the template feature image 22 is equal to or smaller than a threshold or classifies that the coin 100 appearing in the captured image 11 is not genuine when the SAD is greater than the threshold. The classification unit 32 then outputs a classification result 21.

The threshold used by the classification unit 32 is decided, for example, after the use of a plurality of authentic coins 100. Specifically, a plurality of authentic coins 100 are sequentially inserted into a vending machine while the vending machine is not in operation. Then, the image processing system 1 in the vending machine generates a plurality of captured images 11 in which the plurality of authentic coins 100 inserted into the vending machine individually appear. For each of the plurality of captured images 11 generated, the classification unit 32 obtains a SAD between the rotational composite image 70 generated by the feature image generation unit 31 and the template feature image 22 from the captured image 11. The classification apparatus 3 then decides the maximum value of a plurality of SADs obtained by the classification unit 32 as a threshold. The decided threshold is stored in the storage 310 of the classification apparatus 3.

A threshold to be used by the classification unit 32 is decided in this manner, and thus, when the type of the authentic coin 100 is changed, an authentic coin 100 after the change is inserted into the vending machine that is not in operation, so that a threshold corresponding to the authentic coin 100 after the change is decided. Even when the type of an authentic coin 100 is changed, accordingly, whether a coin 100 inserted into a vending machine is genuine, that is, whether it is an authentic coin 100 can be classified properly.

Although a binary edge image 65 is used as a first image 24 showing a coin 100 appearing in a captured image 11 in the example above, a coin region 23 of a gray scale image may be used as the first image 24. In this case, a rotational composite image obtained by composition of a plurality of rotated images obtained by rotating a coin region 23 is set as a feature image 20.

As described above, the feature image generation apparatus 31 according to this embodiment generates, as a feature image 20, at least a part of a rotational composite image 70 obtained by composition of a plurality of rotated images obtained by rotating a first image 24 showing a coin 100. The feature image 20 is unsusceptible to the rotation angle of a coin 100 appearing in a captured image 11 (unsusceptible to the circumferential orientation of the coin 100). Thus, even when the rotation angle (rotation attitude) of a coin 100 appearing in a captured image 11 varies, the feature images 20 (target feature image 20, standard feature image 20) generated by the feature image generation apparatus 31 can be used to classify more precisely whether a coin 100 appearing in the captured image 11 is a genuine one. In other words, even when the circumferential orientation of a coin 100 appearing in a captured image 11 is not constant, whether a coin 100 appearing in the captured image 11 is genuine can be classified more precisely using the feature image 20 generated by the feature image generation apparatus 31. This improves accuracy of classification.

A binary edge image 65 is set as a first image 24 in this embodiment, and accordingly, the effect of a change in the brightness of a captured region in the imaging apparatus 2 on the first image 24 can be more restricted than when a coin region 23 of a gray scale image is set as the first image 24. This restricts the effect of a change in the brightness of a captured region in which an image of a coin 100 is captured on the feature image 20, improving the accuracy of classifying the authenticity of a coin 100.

The extraction unit 41 extracts a coin region 23 from a captured image 11 using template matching in this embodiment, and accordingly, the extraction processing can be more simplified than when the first extraction method involving the Hough transform or the second extraction method involving labeling is used.

In this embodiment, the classification unit 32 compares the feature image 20 generated from the captured image 11 with the template feature image 22 using a SAD or the like to classify, on the basis of the comparison result, whether the coin 100 appearing in the captured image 11 is genuine, leading to simplified classification processing.

<Various Modifications>

The following will describe various modifications.

<First Modification>

The standard feature image 20 is employed as a template feature image 22 to be compared with a target feature image 20 in the example above. Alternatively, a composite image, obtained by composition of a plurality of standard feature images 20 individually generated from a plurality of standard images 11 in which a plurality of different authentic coins 100 individually appear, may be set as a template feature image 22.

Figure 14:
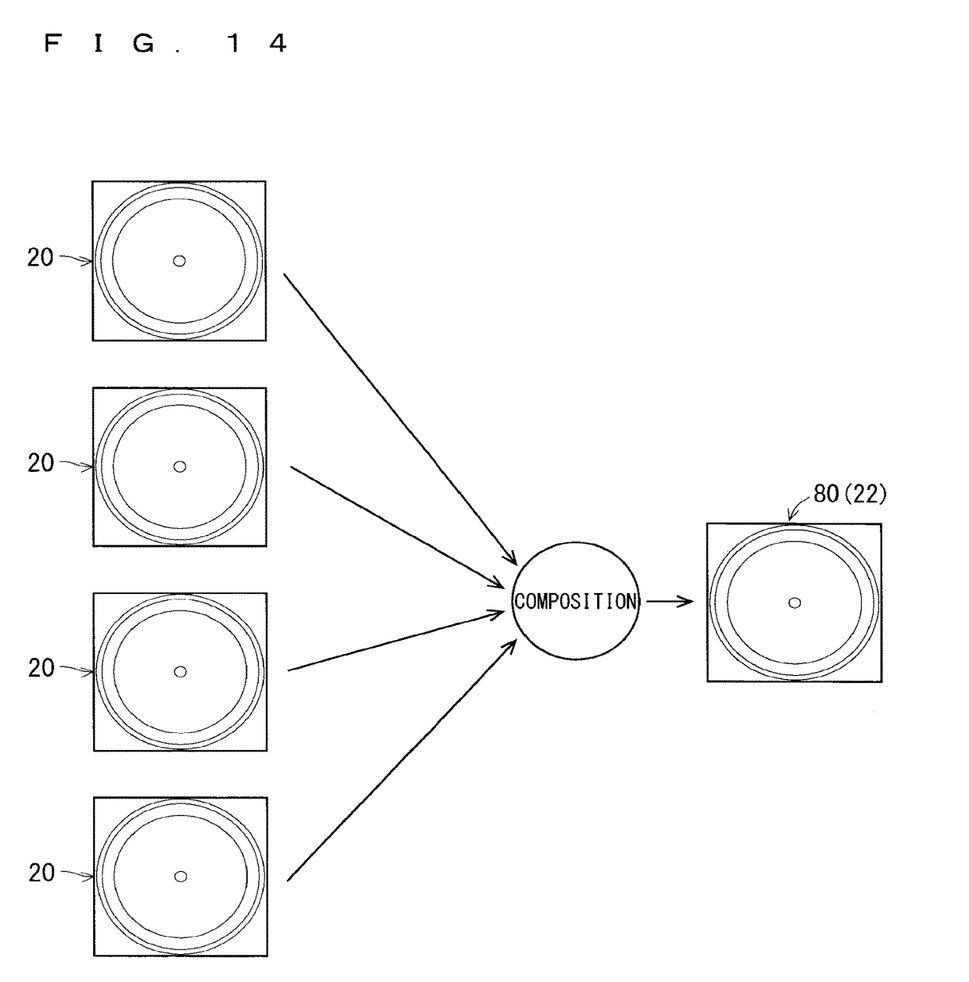
FIG. 14 is a diagram for explaining a method of generating a template feature image.

FIG. 14 is a diagram for explaining a method of generating a template feature image 22 according to this modification. In the example of FIG. 14, in the generation of a template feature image 22, four standard feature images 20 are used that are generated individually from captured images 11 in which four different authentic coins 100 individually appear.

In this modification, when the image processing system 1 generates a template feature image 22, a plurality of authentic coins 100 are sequentially inserted into a vending machine while the vending machine is not in operation. Then, the image processing system 1 in the vending machine generates a plurality of standard images 11 in which the plurality of authentic coins 100 inserted into the vending machine individually appear. For each of the plurality of generated standard images 11, the feature image generation unit 31 generates a standard feature image 20 from the standard image 11. The feature image generation unit 31 then composites the plurality of generated standard feature images 20, and sets a resultant composite image 80 (see FIG. 14) as a template feature image 22. For example, the feature image generation unit 31 averages a plurality of standard feature images 20 and sets a resultant averaged image (composite image 80) as a template feature image 22.

In this way, a composite image 80 obtained by composition of a plurality of standard feature images 20 individually showing the features of different authentic coins 100 is set as a template feature image 22, and accordingly, the effect of an individual difference of the authentic coin 100 on the coin classification processing can be more restricted than when a standard feature image 20 is set as a template feature image 22 without any change. Even when the distance between a coin 100 and an imaging apparatus 2 varies in image capturing of the coin 100 by the imaging apparatus 2, the effect of the variations on the coin classification processing can be restricted. This improves the accuracy of the coin classification processing.

Unlike this embodiment, when a first image 24 showing an authentic coin 100 is used as a standard feature image 20 without any change, in the composition of a plurality of standard feature images 20, the orientations of the plurality of standard feature images 20 need to be aligned such that the rotation angles (rotation attitudes) of a plurality of authentic coins 100 individually appearing in the plurality of standard feature images 20 coincide with each other.

In this modification, contrastingly, a rotational composite image 70 obtained by composition of a plurality of rotated images obtained by rotating a first image 24 showing an authentic coin 100 is used as a standard feature image 20, thereby eliminating the need for aligning the orientations of a plurality of standard feature images 20 in the composition of the plurality of standard feature images 20. The processing of generating a template feature image 22 can therefore be simplified.

When the authentic coin 100 to be used in the generation of a template feature image 22 has a large scratch, even if a plurality of standard feature images 20 are composited to generate a template feature image 22, the effect of the scratch appears in the template feature image 22, which may reduce the accuracy of the coin classification processing.

Therefore, if pixel values of a plurality of pixels at the same position, which are individually included in a plurality of standard feature images 20 individually showing the features of a plurality of authentic coins 100, include a pixel value considerably different from the other pixel values, a template feature image 22 may be generated without using a standard feature image 20 including the pixel having the considerably different pixel value. This restricts the use of a standard feature image 20 showing the feature of an authentic coin having a large scratch in the generation of a template feature image 22. This restricts a decrease in the accuracy of the coin classification processing.

<Second Modification>

Although the second image generation unit 50 sets, as a feature image 20, a rotational composite image 70 obtained by composition of a plurality of rotated images obtained by rotating one image 24 showing a coin 100 in the example above, the feature image 20 may be a part of the rotational composite image 70. Hereinafter, a part of the rotational composite image 70 serving as the feature image 20 is referred to as a "partial feature region 75."

Figure 15:
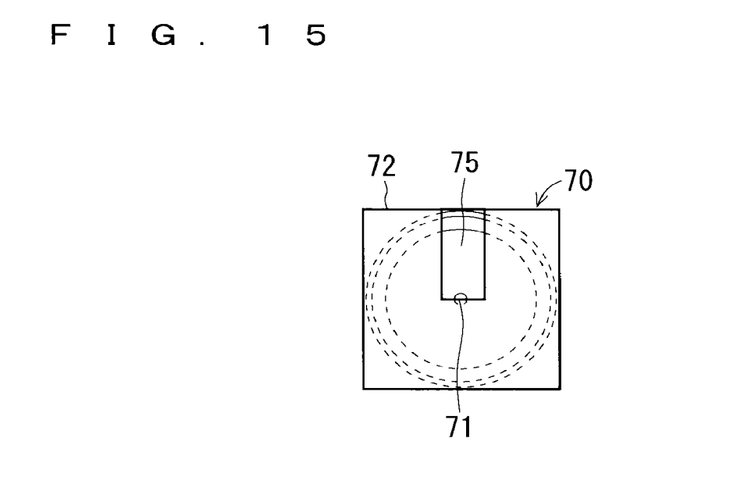
FIGS. 15 to 18 are diagrams for explaining a method of generating a feature image.

FIG. 15 illustrates an example of a partial feature region 75 (feature image 20). In the example shown in FIG. 15, in a quadrangle rotational composite image 70, a rectangular partial region extending from a center 71 to an upper side 72 is set as the partial feature region 75. The partial feature region 75 illustrated in FIG. 15 includes a plurality of pixels in each of the row direction and the column direction. The partial feature region 75 may have a shape other than a rectangle.

For example, the second image generation unit 50 generates a rotational composite image 70 on the basis of a first image 24 showing a coin 100, and then, extracts a partial feature region 75 from the rotational composite image 70, thereby generating a feature image 20.

Figure 16:
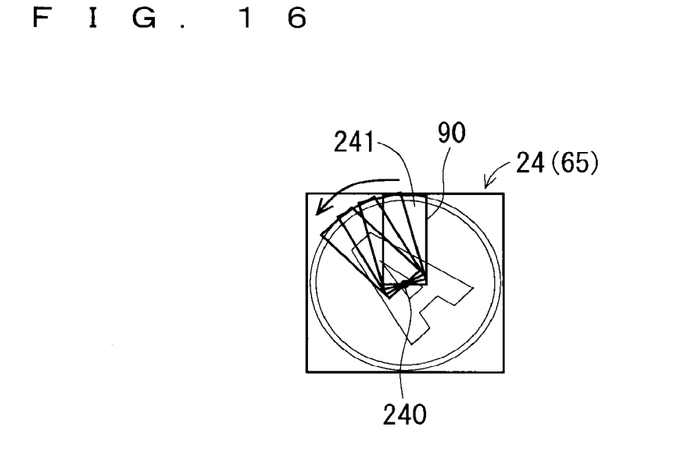

The second image generation unit 50 can generate a feature image 20 without generating a rotational composite image 70. FIG. 16 is a diagram for explaining the method therefor. As illustrated in FIG. 16, the second image generation unit 50 sets an extraction window 90 with respect to the first image 24 generated by the first image generation unit 40 and extracts a partial region 241 in the extraction window 90. The extraction window 90 is equal in size to the partial feature region 75. The extraction window 90 is set, in the first image 24, at the same position as the position of the partial feature region 75 in the rotational composite image 70 (see FIG. 15). The thus extracted partial region 241 is referred to as a "reference partial region 241."

Next, the second image generation unit 50 causes the extraction window 90 to rotate about a center 240 of the first image 24 in increments of a predetermined angle β, thereby extracting a partial region 241 in the extraction window 90 at each rotation angle. Herein, the second image generation unit 50 causes the extraction window 90 to rotate about the center 240 of the first image 24 in increments of the predetermined angle β until a total of rotation angles reaches (360°−β), where β is, for example, 2°. The second image generation unit 50 then composites the plurality of obtained partial regions 241, thereby generating a composite image. In this generation, in the plurality of obtained partial regions 241, the second image generation unit 50 causes the partial regions 241 except for the reference partial region 241 to rotate so as to align with the outline of the reference partial region 241, and then, composites the plurality of partial regions 241. For example, the second image generation unit 50 averages the plurality of obtained partial regions 241 to generate an averaged image, thereby generating a composite image of the plurality of partial regions 241. The averaged image (composite image) serves as a partial feature region 75.

Setting a part of a rotational composite image 70 as a feature image 20 as described above reduces the number of pixels of a feature image 20. This simplifies the processing by the classification unit 32 using a feature image 20.

When the second image generation unit 50 causes an extraction window 90 to rotate in increments of a predetermined angle, extracts a partial region 241 in the extraction window 90 at each rotation angle, and composites the plurality of obtained partial regions 241 to generate a feature image 20, the number of pixels of images handled in the generation of the feature image 20 can be reduced, leading to simplified processing of generating a feature image 20.

Which part of the rotational composite image 70 is set as a partial feature region 75 is decided on the basis of, for example, the position of a pattern shown in the authentic coin 100. That is, a part of the rotational composite image 70 is set in the partial feature region 75 such that the feature of the coin 100 is sufficiently exhibited in the partial feature region 75.

For example, when the pattern of the authentic coin 100 is present almost entirely on the main surface 100a of the coin 100 as illustrated in FIG. 2, as in this example, a partial feature region 75 is desirably set so as to extend from the center 71 to the side 72 in the rotational composite image 70.

Figure 17:
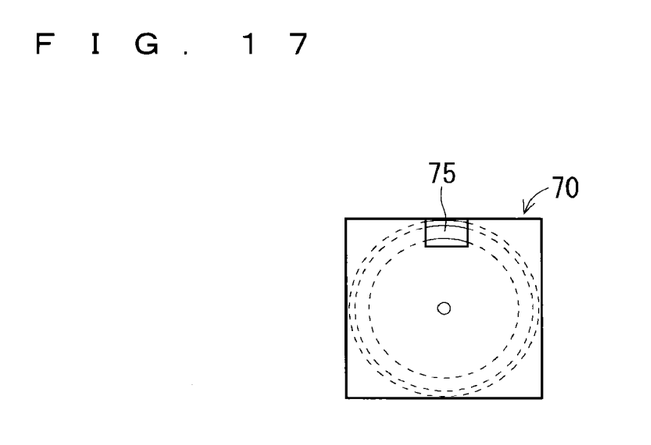

When the pattern of the coin 100 is present only on the peripheral edge portion of the main surface 100a of the coin 100, as illustrated in FIG. 17, only the edge portion of the rotational composite image 70 may be set as the partial feature region 75.

Figure 18:
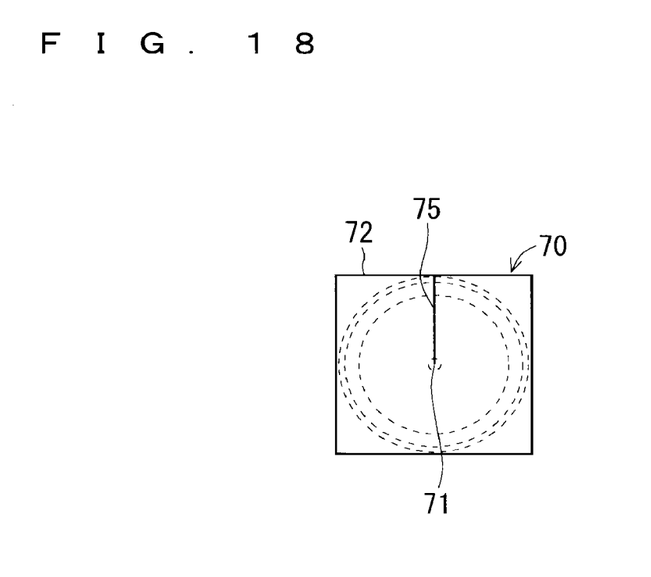

When the pattern of the coin 100 is present almost entirely on the main surface 100a of the coin 100, a partial feature region 75 may be linear as illustrated in FIG. 18. The partial feature region 75 illustrated in FIG. 18 includes a plurality of pixels in the column direction and only one pixel in the row direction.

<Other Modifications>

Although the image processing system 1 is introduced into a vending machine in the example above, it may be introduced into any other apparatus or in any other place.

For example, the image processing system 1 may be introduced into a production line of assembling a product in a factory. More specifically, the image processing system 1 may be introduced into, for example, a production line of mounting a plurality of components on a substrate. In this case, the imaging apparatus 2 captures an image of the substrate including a plurality of components mounted thereon. The feature image generation unit 31 generates, on the basis of the captured image 11 in which a substrate including a plurality of components mounted thereon appears, a feature image showing the feature of the substrate. The classification unit 32 classifies, on the basis of the feature image generated by the feature image generation unit 31, whether the substrate including a plurality of components mounted thereon, which appears in the captured image 11, corresponds to a substrate including a plurality of components properly mounted thereon, that is, whether a plurality of components are properly mounted on a substrate. A plurality of components on a substrate can be treated similarly to the pattern on the surface of a coin, and thus, as in the manner described above, the image processing system 1 can classify whether a plurality of components are properly mounted on a substrate. This enables the detection of, for example, erroneous mounting of a component and an omission of a to-be-mounted component.

The image processing system 1 may be introduced into a production line of producing snacks in a factory. More specifically, the image processing system 1 may be introduced into a production line of producing snacks having a pattern on their surfaces, such as cookies and chocolates. In this case, an image of the produced snack is captured by the imaging apparatus 2. The feature image generation unit 31 generates a feature image showing the feature of the snack on the basis of the captured image 11 in which the snack appears. The classification unit 32 classifies, on the basis of the feature image generated by the feature image generation unit 31, whether the snack appearing in the captured image 11 corresponds to a properly produced snack (non-defective snack), that is, whether the snack appearing in the captured image 11 has been properly produced. The pattern on the surface of the snack can be handled similarly to the pattern of the surface of a coin, and accordingly, the image processing system 1 can classify whether the snack has been properly produced as in the manner described above. This enables the detection of, for example, a distortion and an omission of the pattern of a snack.

The image processing system 1 may be introduced into a conveyor-belt sushi restaurant. In the conveyor-belt sushi restaurant, a price corresponding to the pattern of a dish on which a product is put may be set as the price of a product such as sushi. Besides, in the conveyor-belt sushi restaurant, a total of the prices corresponding to the patterns of the dishes picked up by a customer may be calculated as a price of food and drink. The image processing system 1 introduced into such a conveyor-belt sushi restaurant identifies the pattern of the dish picked up by a customer through image processing.

Specifically, when a guest picks up a dish from the revolving conveyor belt with a plurality of dishes on which sushi or the like is put, the imaging apparatus 2 captures an image of the dish. The feature image generation unit 31 generates a feature image showing the feature of the dish on the basis of the captured image 11 in which the dish appears.

Herein, a pattern is provided to an edge portion of a dish, and a product such as sushi is put at the central portion (portion with no pattern) of the dish. The central portion of an edge image 65 generated by the first image generation unit 40 of the feature image generation unit 31 shows a product and does not show the feature of the dish, and thus, the first image generation unit 40 sets the portion of the edge image 65 except for the central portion as the first image 24 showing a dish. The second image generation unit 50 of the feature image generation unit 31 sets, as a feature image, at least a part of a rotational composite image obtained by composition of a plurality of rotated images obtained by rotating the first image 24.

The classification unit 32 classifies whether the dish appearing in the captured image 11 corresponds to a dish having a predetermined pattern on the basis of the feature image generated by the feature image generation unit 31. That is to say, the classification unit 32 classifies whether the pattern of the dish appearing in the captured image 11 corresponds to a predetermined pattern on the basis of a feature amount. The pattern on the front surface of the dish can be handled similarly to the pattern on the surface of the coin, and accordingly, as in the manner described above, the image processing system 1 can classify whether the dish appearing in the captured image 11 corresponds to the dish having a predetermined pattern. For each of a plurality of types of patterns individually provided to a plurality of types of dishes used in a conveyor-belt sushi restaurant, the classification unit 34 classifies whether the pattern corresponds to the pattern of the dish appearing in the captured image 11. Thus, a price corresponding to the pattern of the dish appearing in the captured image 11 can be identified automatically. This enables automatic calculation of a total of the prices corresponding to the patterns of the dishes picked up by a guest, that is, the price of food and drink.

The image processing system 1 may be introduced into a distribution depot. In the distribution depot, a sticker labelled with a delivery address or the like may be attached to a package such as a cardboard box. The image processing system 1 classifies whether the sticker attached to the package corresponds to a proper sticker, that is, whether a proper sticker is attached to the package. In this case, the imaging apparatus 2 captures an image of the sticker attached to the package. The feature image generation unit 31 generates a feature image showing the feature of the sticker on the basis of a captured image 11 in which the sticker appears. The classification unit 32 classifies, on the basis of the feature image generated by the feature image generation unit 31, whether the sticker appearing in the captured image 11 corresponds to a proper sticker, that is, whether the sticker appearing in the captured image 11 is proper one. The characters or the like on the sticker surface can be handled similarly to the pattern on the coin surface, and thus, as in the manner described above, the image processing system 1 can classify whether a proper sticker is attached to the package. This enables the detection of, for example, erroneous attachment of a sticker.

What is claimed is:

1. A classification apparatus comprising:
   circuitry configured to:
   generate, based on a processing target image, a first image showing an object, the processing target image being generated by an image capturing circuit that captures an image of the object whose circumferential orientation is not constant when the image capturing circuit captures the image;
   generate, as a feature image showing a feature of the object, at least a part of a piece of a first rotational combined image obtained by combining a plurality of first rotated images obtained by rotating the first image;
   compare the feature image with a template feature image showing a feature of a comparison target and classify, based on a comparison result, whether the object appearing in the processing target image corresponds to the comparison target, wherein the template feature image is a composite image obtained by composition of a plurality of standard feature images individually generated based on a plurality of standard images in which a plurality of comparison targets individually appear, and each of the plurality of standard feature images is at least a part of a second rotational combined image obtained by combining a plurality of second rotated images obtained by rotating a second image that is generated based on the standard image used in the generation of the standard feature image and shows a comparison target appearing in the standard image; and
   classify, based on the feature image, whether the object appearing in the processing target image is proper, the object being one of a coin, a substrate on which a plurality of components are mounted, a snack, and a sticker attached to a package.

2. The classification apparatus according to claim 1, wherein the circuitry is further configured to:
   extract an object region in which the object appears from the processing target image, and
   perform edge detection on the object region to generate an edge image as the first image.

3. The classification apparatus according to claim 2, wherein the circuitry is further configured to:

generate a background subtraction image showing a difference between the processing target image and a background image, and perform template matching on the background subtraction image using a template showing an outline of the object to extract the object region from the processing target image.

4. The classification apparatus according to claim 1, wherein the circuitry is further configured to generate a part of the first rotational combined image as the feature image.

5. A method for classification implemented by circuitry, the method comprising:

generating, based on a processing target image, a first image showing an object, the processing target image being generated by an image capturing circuit that captures an image of the object whose circumferential orientation is not constant when the image capturing circuit captures the image;

generating, as a feature image showing a feature of the object, at least a part of a piece of a first rotational combined image obtained by combining a plurality of first rotated images obtained by rotating the first image;

comparing the feature image with a template feature image showing a feature of a comparison target and classify, based on a comparison result, whether the object appearing in the processing target image corresponds to the comparison target, wherein the template feature image is a composite image obtained by composition of a plurality of standard feature images individually generated based on a plurality of standard images in which a plurality of comparison targets individually appear, and each of the plurality of standard feature images is at least a part of a second rotational combined image obtained by combining a plurality of second rotated images obtained by rotating a second image that is generated based on the standard image used in the generation of the standard feature image and shows a comparison target appearing in the standard image; and classifying, based on the feature image, whether the object appearing in the processing target image is proper, the object being one of a coin, a substrate on which a plurality of components are mounted, a snack, and a sticker attached to a package.

* * * * *